(12) United States Patent
Fujino et al.

(10) Patent No.: US 8,084,988 B2
(45) Date of Patent: Dec. 27, 2011

(54) POWER SUPPLY SYSTEM

(75) Inventors: Takeshi Fujino, Wako (JP); Minoru Noguchi, Wako (JP); Eisuke Komazawa, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 12/453,696

(22) Filed: May 19, 2009

(65) Prior Publication Data

US 2009/0289589 A1     Nov. 26, 2009

(30) Foreign Application Priority Data

May 21, 2008 (JP) ................. 2008-133616
Apr. 9, 2009 (JP) ................. 2009-095336

(51) Int. Cl.
*H01M 10/46* (2006.01)
(52) U.S. Cl. ........................................ 320/104
(58) Field of Classification Search ............ 320/101, 320/104, 107, 134, 136, 137, 138, 150
See application file for complete search history.

(56) References Cited

U.S. PATENT DOCUMENTS

| 4,847,545 A * | 7/1989 | Reid ................... 320/104 |
| 2003/0156439 A1* | 8/2003 | Ohmichi et al. ........ 363/98 |

FOREIGN PATENT DOCUMENTS

JP    2006-288129    10/2006

* cited by examiner

*Primary Examiner* — Edward Tso
(74) *Attorney, Agent, or Firm* — Squire, Sanders & Dempsey (US) LLP (57) ABSTRACT

A power supply system includes a fuel cell, a capacitor connected in parallel to the fuel cell, a voltage boost means for boosting output voltages from the fuel cell and the capacitor to supply the electric motor with electric power resulting from the boosted voltages, a voltage control means for further boosting an output voltage from the voltage boost means, a secondary battery connected to the voltage control means, an external power source connecting means connected to the one end of the voltage boost means and in parallel with the fuel cell and for receiving supply of electric power from an external power source, and an electronic control unit which charges the secondary battery from the external power source by controlling step-up ratios of the voltage boost means and the voltage control means such that a voltage applied to the secondary battery during the charging becomes a desired voltage.

8 Claims, 6 Drawing Sheets

POWER SUPPLY SYSTEM

BACKGROUND OF THE INVENTION

1. Field of the Invention

The present invention relates to a power supply system mounted on a vehicle.

2. Description of the Related Art

There is conventionally known a fuel cell power supply system mounted on a vehicle, which system includes a fuel cell, a secondary battery, a voltage boosting means having one end connected to the fuel cell and another end connected to the secondary battery and for boosting a voltage on the one end for supply to the other end, and a plurality of electric motors each provided on either end of the voltage boosting means (see Japanese Patent Application Laid-Open No. 2006-288129). In this power supply system, load distribution to the plurality of electric motors is controlled in accordance with the operating state of the fuel cell and the charge level of the secondary battery.

For charging the secondary battery, part of the electric power output from the fuel cell is supplied via the voltage boosting means to the secondary battery, and regenerative energy from the electric motors is also supplied to the secondary battery.

The fuel cell uses hydrogen as its fuel. There are only a limited number of stations for charging the hydrogen. Thus, it is desired to use the output power from the fuel cell for running the vehicle as much as possible, to reduce the consumed amount of the hydrogen.

Furthermore, the electric power supply from the fuel cell to the secondary battery may be reduced by charging the secondary battery in advance from an external power source. This however may require a dedicated charging facility. Further, using a general commercial power supply for charging will cost much time as well as much money.

SUMMARY OF THE INVENTION

In view of the foregoing, an object of the present invention is to provide a power supply system capable of externally charging an electric power accumulating means in a simple and appropriate method in consideration of the configuration of the power supply system.

To achieve the above object, a power supply system according to a first invention is a power supply system mounted on a vehicle, which system includes: an electric power supply means; a first voltage boosting means having one end connected to the electric power supply means and another end connected to an electric motor for driving the vehicle, the first voltage boosting means boosting an output voltage from the electric power supply means for supplying the electric motor with electric power resulting from the boosted voltage; a second voltage boosting means having one end connected to the other end of the first voltage boosting means and in parallel with the electric motor, the second voltage boosting means further boosting an output voltage from the first voltage boosting means; an electric power accumulating means connected to another end of the second voltage boosting means; and an external power source connecting means connected to the one end of the first voltage boosting means and in parallel with the electric power supply means, the external power source connecting means receiving supply of electric power from an external power source.

According to the power supply system of the first invention, in the power supply system configured such that the output voltage from the electric power supply means is boosted by the first voltage boosting means and the electric power resulting from the boosted voltage is supplied to the electric motor, and that the second voltage boosting means is used as a voltage step-down means from the electric power accumulating means side so that electric power is supplied from the electric power accumulating means to the electric motor supplementarily, the external power source connecting means is provided on the one end of the first voltage boosting means where the voltage is at the lowest level. This eliminates the need to boost the voltage of the external power source connected to the external power source connecting means, before supplying the voltage.

Further, the electric power supplied from the external power source has its voltage boosted by the first voltage boosting means and further by the second voltage boosting means. As such, the electric power which has been supplied at a low voltage level from the external power source can be boosted to a high voltage level before being supplied to the electric power accumulating means. This ensures a high voltage level in the electric power accumulating means and also ensures a small current flowing through the electric power accumulating means during the charging. By realizing the charging with a high voltage and a small current, it is possible to charge the electric power accumulating means with good efficiency and in a short period of time, even in the case where the internal resistance in the electric power accumulating means becomes large in a cold climate area or in the case of performing quick charge. As described above, according to the power supply system of the present invention, the electric power accumulating means can be charged from the outside in a simple and appropriate method in consideration of the configuration of the power supply system.

A power supply system according to a second invention is characterized in that, in the power supply system of the first invention, it further includes: a first suppressing means for suppressing supply of electric power from the external power source to the electric power supply means; and a charging control means for charging the electric power accumulating means from the external power source by controlling step-up ratios of the first voltage boosting means and the second voltage boosting means such that a voltage applied to the electric power accumulating means during the charging becomes a desired voltage.

According to the power supply system of the second invention, while the first suppressing means prevents the electric power which has been supplied from the external power source from being supplied to the electric power supply means, the charging control means controls the step-up ratios of the first and second voltage boosting means so that the charging can be performed with a high voltage corresponding to the voltage of the electric power accumulating means. Accordingly, it is possible to charge the electric power accumulating means from the outside in an appropriate manner.

A power supply system according to a third invention is characterized in that, in the power supply system of the second invention, it further includes a temperature detecting means for detecting a temperature of the electric power accumulating means, and the charging control means derives a maximum current that can flow into the electric power accumulating means in accordance with the temperature detected by the temperature detecting means, to charge the electric power accumulating means with the maximum current.

In the electric power accumulating means, the internal resistance increases as the temperature decreases. Thus, it is necessary to charge the electric power accumulating means within the range up to the maximum current corresponding to its temperature in the case of charging it in a cold climate area or in the case of charging it using nighttime power. According to the power supply system of the third invention, the charge control means derives the maximum current corresponding to the temperature of the electric power accumulating means by referring to a map and the like defining the relation between the temperature and the state of charge (SOC) of the electric power accumulating means, and charges the electric power accumulating means with the maximum current. Accordingly, it is possible to charge the electric power accumulating means from the outside in an appropriate method by reducing the load applied to the electric power accumulating means due to the charging.

A power supply system according to a fourth invention is characterized in that, in the power supply system of one of the first to third inventions, the external power source connecting means includes a power supply voltage detecting means for detecting an output voltage from the external power source, and the charging control means controls the step-up ratios of the first voltage boosting means and the second voltage boosting means in accordance with the output voltage detected by the power supply voltage detecting means.

According to the power supply system of the fourth invention, the step-up ratios of the first and second voltage boosting means are changed according to the output voltage from the external power source such that the voltage applied to the electric power accumulating means during the charging becomes a desired voltage. Accordingly, it is possible to charge the electric power accumulating means in an appropriate method in accordance with the external power source connected to the external power source connecting means.

A power supply system according to a fifth invention is characterized in that, in the power supply system of one of the first to fourth inventions, the electric power supply means is a fuel cell.

According to the power supply system of the fifth invention, in the power supply system configured such that the output voltage from the fuel cell is boosted by the first voltage boosting means and the electric power resulting from the boosted voltage is supplied to the electric motor, and that the second voltage boosting means is used as a voltage step-down means from the electric power accumulating means side so that electric power is supplied from the electric power accumulating means to the electric motor supplementarily, the electric power accumulating means can be charged efficiently from the one end of the first voltage boosting means where the voltage is at the lowest level, with the electric power supply from the external power source to the fuel cell being suppressed. Accordingly, it is possible to charge the electric power accumulating means from the outside in an appropriate method in consideration of the configuration of the power supply system.

A power supply system according to a sixth invention is characterized in that, in the power supply system of the fifth invention, it further includes: a capacitor connected to the one end of the first voltage boosting means and in parallel with the fuel cell; and a second suppressing means for suppressing supply of electric power from the external power source to the capacitor.

According to the power supply system of the sixth invention, in the power supply system configured such that the output voltages of the fuel cell and the capacitor are boosted by the first voltage boosting means and the electric power resulting from the boosted voltages is supplied to the electric motor, and that the second voltage boosting means is used as a voltage step-down means from the electric power accumulating means side so that electric power is supplied from the electric power accumulating means to the electric motor supplementarily, the electric power accumulating means can be charged efficiently from the one end of the first voltage boosting means where the voltage is at the lowest level, with the electric power supply from the external power source to the fuel cell and the capacitor being suppressed. Accordingly, it is possible to charge the electric power accumulating means from the outside in an appropriate method in consideration of the configuration of the power supply system. It is noted that the second suppressing means may be provided independently of the first suppressing means, or a single suppressing means may serve as both the first and second suppressing means.

A power supply system according to a seventh invention is characterized in that, in the power supply system of one of the first to fourth inventions, the electric power supply means includes an engine and a generator, wherein the generator is connected to an output shaft of the engine and serves as an electric power generator.

According to the power supply system of the seventh invention, in the power supply system configured such that the output voltage from the generator is boosted by the first voltage boosting means and the electric power resulting from the boosted voltage is supplied to the electric motor, and that the second voltage boosting means is used as a voltage step-down means from the electric power accumulating means side so that electric power is supplied from the electric power accumulating means to the electric motor supplementarily, the electric power accumulating means can be charged efficiently from the one end of the first voltage boosting means where the voltage is at the lowest level, with the electric power supply from the external power source to the generator being suppressed. Accordingly, it is possible to charge the electric power accumulating means from the outside in an appropriate method in consideration of the configuration of the power supply system.

A power supply system according to an eighth invention is characterized in that, in the power supply system of one of the first to fourth inventions, the electric power supply means includes a high energy density secondary battery, and the electric power accumulating means includes a high output density secondary battery.

According to the power supply system of the eighth invention, in the power supply system configured such that the output voltage from the high energy density secondary battery is boosted by the first voltage boosting means and the electric power resulting from the boosted voltage is supplied to the electric motor, and that the second voltage boosting means is used as a voltage step-down means from the side of the high output density secondary battery serving as the electric power accumulating means so that electric power is supplied from the high output density secondary battery to the electric motor supplementarily, the high output density secondary battery can be charged efficiently from the one end of the first voltage boosting means where the voltage is at the lowest level, with the electric power supply from the external power source to the high energy density secondary battery being suppressed. Accordingly, it is possible to charge the high output density secondary battery serving as the electric power accumulating means from the outside, in an appropriate method in consideration of the configuration of the power supply system.

DESCRIPTION OF THE PREFERRED EMBODIMENTS

First Embodiment

Figure 1:
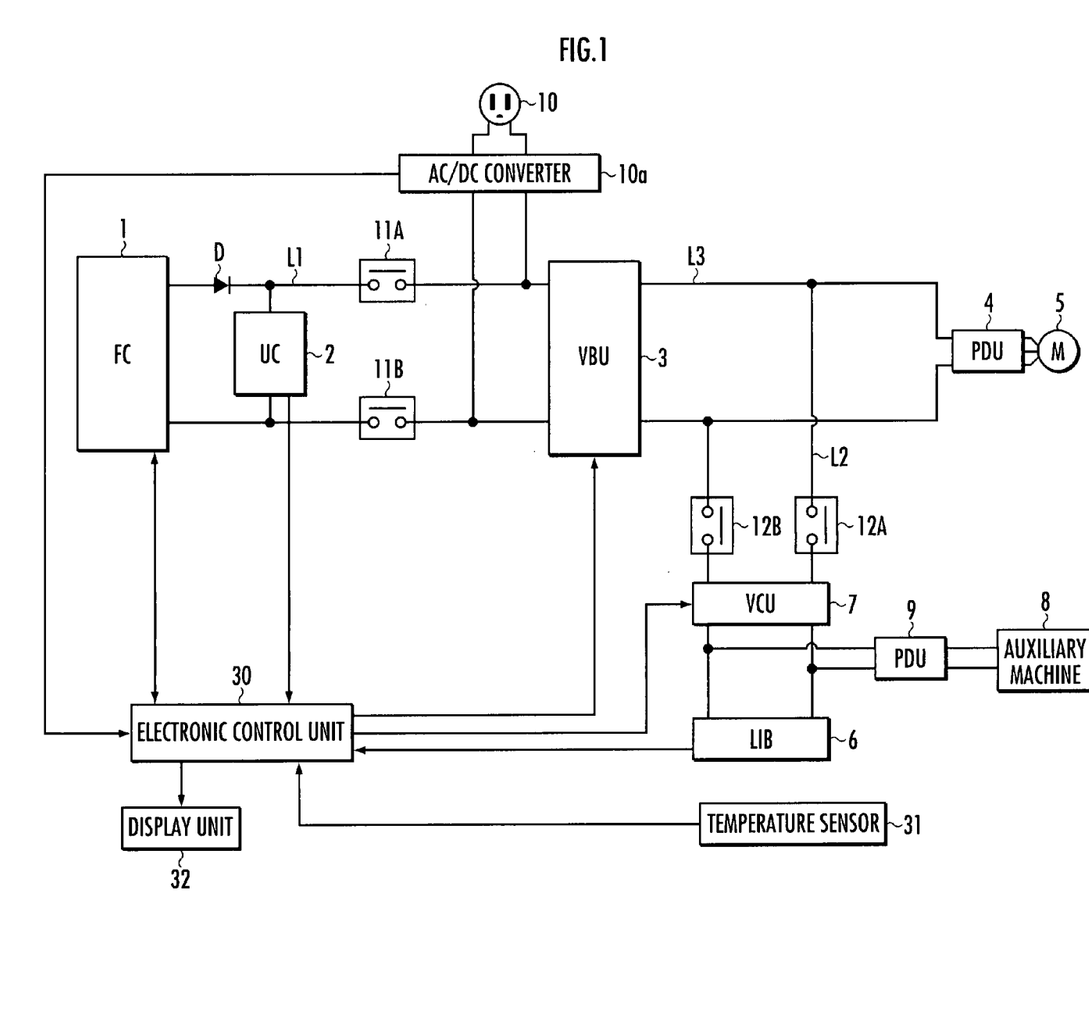
FIG. 1 illustrates an overall configuration of a power supply system according to an embodiment of the present invention.

Referring to FIG. 1, a power supply system according to an embodiment of the present invention is mounted on a fuel cell vehicle (corresponding to the "vehicle" of the present invention). The power supply system includes: a fuel cell 1 serving as an electric power supply means; an electrical double layer capacitor 2 (hereinafter, simply referred to as the "capacitor 2") connected in parallel to the fuel cell 1; a voltage boost means 3 (Voltage Boost Unit; corresponding to the "first voltage boosting means" of the present invention) having one end connected to the fuel cell 1 and the capacitor 2 and the other end connected to an electric motor 5 via a power drive unit (PDU) 4; and a voltage control means 7 (Voltage Control Unit; corresponding to the "second voltage boosting means" of the present invention) having one end connected to the voltage boost means 3 and the other end connected to a secondary battery 6 (which is a lithium ion battery in the present embodiment).

The fuel cell 1 is made up, e.g., of 250 fuel cell stacks connected in series, and has an output voltage fluctuating in a range from about 225 V (at the output current of 0 A) to about 180 V (at the output current of 230 A). The capacitor 2 is the electrical double layer capacitor having an output voltage fluctuating in a range around 200 V (from the lower limit of about 150 V to the upper limit of about 250 V). The secondary battery 6 has an output voltage fluctuating in a range from about 300 V to about 500 V.

The voltage boost means 3 is a DC/DC converter with a power rating of 70 kw and a step-up ratio of 1.2 to 3.0, for example. The voltage boost means 3 has at least a voltage step-up function, and optionally has a voltage step-down function. The voltage control means 7 is a DC/DC converter with a power rating of 30 kw and a step-up ratio of 1.2 to 3.0, for example. At least one of the voltage boost means 3 and the voltage control means 7 carries out current feedback control to restrict the boosted current value not to exceed a preset value.

The power supply system further includes an external power source connecting means 10 (which is an input terminal in the present embodiment), which is connected between the capacitor 2 and the voltage boost means 3 and in parallel with the fuel cell 1 and the capacitor 2. The external power source connecting means 10 is connected via an AC/DC converter 10a, which is composed of an inverter circuit, to a first electric power supply line L1 which is directly connected to the fuel cell 1 and the capacitor 2. The AC/DC converter 10a converts a commercial AC voltage from an external power source (not shown) connected to the external power source connecting means 10, to a DC voltage for supply to the first electric power supply line L1.

The power supply system further includes an auxiliary machine 8 which is connected between, and in parallel with, the secondary battery 6 and the voltage control means 7. The auxiliary machine 8 is for example a pump for supplying a reaction gas, such as a hydrogen gas, to the fuel cell 1. The auxiliary machine 8 is connected via a power drive unit (PDU) 9 to a second electric power supply line L2 which is directly connected to the secondary battery 6 and the voltage control means 7.

The first electric power supply line L1 is provided with first contactors 11A, 11B (each corresponding to the "first suppressing means" and the "second suppressing means" of the present invention) which turn ON/OFF the connection of the first electric power supply line L1 with the fuel cell 1 and the capacitor 2. The second electric power supply line L2 is provided with second contactors 12A, 12B which are arranged between the voltage boost means 3 and the voltage control means 7 and turn ON/OFF the supply of electric power from a third electric power supply line L3 to the second electric power supply line L2. The first and second contactors 11 and 12 are switched between ON/OFF under the control of an electronic control unit 30, which will be described below.

The power supply system includes the electronic control unit 30 (which also functions as the "charging control means" of the present invention). The electronic control unit 30 obtains detection signals from voltage and current sensors (not shown) provided in each of the fuel cell 1, the capacitor 2, and the secondary battery 6, to detect the voltage, current, and electric power output from a respective one of the fuel cell 1, the capacitor 2, and the secondary battery 6.

Further, the electronic control unit 30 estimates an open circuit voltage of the capacitor 2 based on the voltage and current output from the capacitor 2, and estimates the state of charge (hereinafter, referred to as the "SOC") of the capacitor 2 by referring to a map, a data table and the like (hereinafter, referred to as a "map etc.") defining the relation between the estimated open circuit voltage and the SOC of the capacitor 2. Similarly, the electronic control unit 30 estimates an open circuit voltage of the secondary battery 6 from the voltage and current output from the secondary battery 6, and estimates the SOC of the secondary battery 6 by referring to a map etc. defining the relation between the estimated open circuit voltage and the SOC of the secondary battery 6.

Furthermore, the electronic control unit 30 controls an operation of the fuel cell 1 and an operation of either the voltage boost means 3 or the voltage control means 7, based on the output of the fuel cell 1, the SOC of the capacitor 2, and the SOC of the secondary battery 6, to perform electric power supply from the fuel cell 1, the capacitor 2, and the secondary battery 6 to the electric motor 5, and also to perform charging of the capacitor 2 and the secondary battery 6 from the fuel cell 1.

With the electric motor 5 functioning as an electric power generator during deceleration of the vehicle, the electronic control unit 30 collects the electric power regenerated by the electric motor 5 during the deceleration of the vehicle to charge the capacitor 2 and the secondary battery 6 with the regenerative power. To this end, the electronic control unit 30 detects the electric power regenerated by the electric motor 5, via voltage and current sensors (not shown) provided in the PDU 4, to control the operation of the voltage boost means 3 or the voltage control means 7 so as to charge the capacitor 2 and the secondary battery 6 from the electric motor 5.

The electronic control unit 30 is further connected to an AC/DC converter 10a, which is provided with current and voltage sensors (not shown). The electronic control unit 30, based on the values detected by the current and voltage sensors in the AC/DC converter 10a, recognizes that an external power source has been connected to the external power source connecting means 10 and obtains the output voltage from the external power source connected. The electronic control unit 30 is also connected to a temperature sensor 31 (corresponding to the "temperature detecting means" of the present invention) which is attached to the secondary battery 6 for detecting the temperature thereof. The electronic control unit 30 obtains the temperature of the secondary battery 6 from the temperature sensor 31.

Based on the information obtained as described above, the electronic control unit 30 turns OFF the first contactors 11A, 11B and turns ON the second contactors 12A, 12B to control the operations of the voltage boost means 3 and the voltage control means 7, to thereby charge the secondary battery 6 from the external power source.

Furthermore, the electronic control unit 30 includes a display unit 32, which is composed of a liquid crystal display means on which various states of the power supply system are displayed. For example, the display unit 32 displays the output state of the fuel cell, the SOC of the capacitor 2 and the SOC of the secondary battery 6 which are calculated by the electronic control unit 30, and the progress of charging of the secondary battery 6 by the external power source as well as the time required to complete the charging.

In the power supply system of the present embodiment, a diode D (also functioning as the "first suppressing means" of the present invention) is provided between the fuel cell 1 on one side and the voltage boost means 3 and the capacitor 2 on the other side, to prevent the current from flowing into the fuel cell 1. Alternatively, a transistor or another rectifying device may be used in place of the diode D, or the capacitor 2 may be connected to the fuel cell 1 via a voltage step-down means (voltage step-down transformer), to prevent the current from flowing into the fuel cell 1.

The overall configuration of the power supply system of the present embodiment has been described above.

Figure 2:
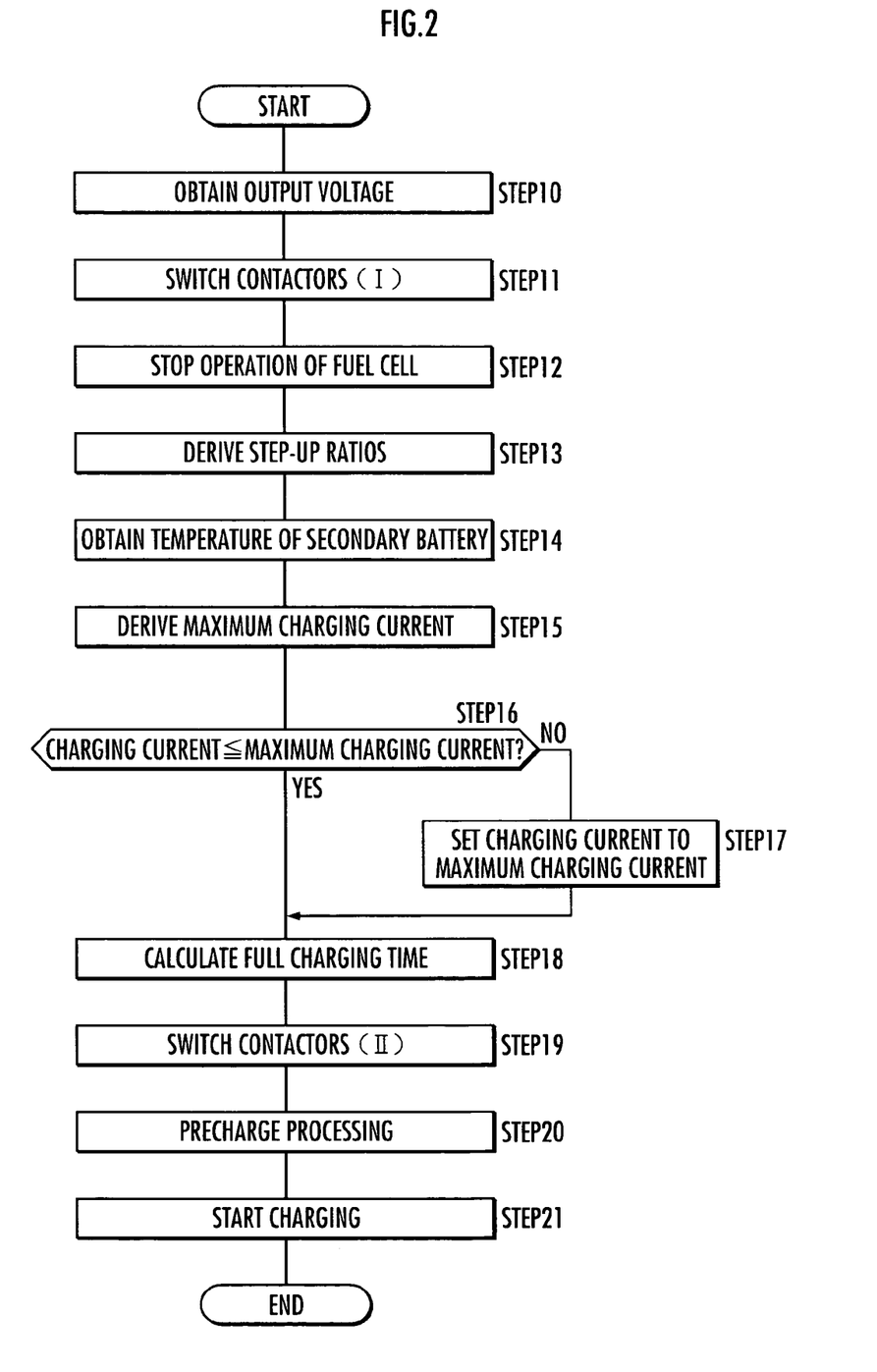
FIG. 2 is a flowchart illustrating secondary battery charging processing.

Hereinafter, an operation of charging the secondary battery 6 in the power supply system according to the present embodiment will be described with reference to the flowchart illustrated in FIG. 2.

Firstly, when an external power source is connected to the external power source connecting means 10, the electronic control unit 30 recognizes that the external power source has been connected, and obtains the output voltage from the external power source, via the AC/DC converter 10a (STEP 10).

At this time, the electronic control unit 30 turns OFF both the first and second contactors 11 and 12 (STEP 11). The electronic control unit 30 also stops the operation of the fuel cell 1, or if it has already been stopped, confirms that the operation is stopped (STEP 12).

Turning OFF the first contactors 11A, 11B cuts off the electric power supply from the fuel cell 1 and the capacitor 2, and at the same time, prevents the current from flowing into (i.e., the electric power from being supplied to) the fuel cell 1 and the capacitor 2 from the external power source. Turning OFF the second contactors 12A, 12B cuts off the electric power supply to the voltage control means 7 and the PDU 9 until charging is started as will be described later. Switching the contactors in this manner can prevent the electric power from being wasted before the start of charging.

The electronic control unit 30 then derives step-up ratios of the voltage boost means 3 and the voltage control means 7 from the output voltage of the external power source obtained in STEP 10 and the output voltage of the secondary battery 6 (STEP 13).

To derive the step-up ratios, an overall step-up ratio required to make the output voltage from the external power source equal to the output voltage from the secondary battery 6 is calculated, and from the overall step-up ratio, the step-up ratios of respective ones of the voltage boost means 3 and the voltage control means 7 are derived. Although the proportion of each of the step-up ratios of the voltage boost means 3 and the voltage control means 7 in the overall step-up ratio may be determined in advance, it is preferred to refer to a map etc. defining the relation between each of the step-up ratios of the voltage boost means 3 and the voltage control means 7 and the efficiency (rate of loss), to derive the respective step-up ratios from the overall step-up ratio. This can reduce the loss caused when the voltage is boosted by the voltage boost means 3 and the voltage control means 7.

Next, the electronic control unit 30 refers to the output from the temperature sensor 31 to obtain the temperature of the secondary battery 6 (STEP 14). The electronic control unit 30 then derives, from the obtained temperature of the secondary battery 6, a maximum value of the charging current (hereinafter, referred to as the "maximum charging current") for the secondary battery 6 that is defined according to the temperature (STEP 15). The maximum charging current may be derived by referring to a relational expression, data table, or map etc. showing the relation between the temperature and the maximum current, which is defined in advance according to the type of the secondary battery 6.

For example, in the case of the secondary battery 6 with the capacity of 4 kwh, the maximum applicable current I at the time of charging is defined according to the temperature, as shown in the following table.

TABLE 1

| Secondary Battery Temperature (Outdoor Air Temperature): T [° C.] | Maximum Applicable Current During Charging: I [A] |
|---|---|
| T ≧ 25 | I = 20 |
| 10 ≦ T < 25 | I = 8 |
| 0 ≦ T < 10 | I = 4 |

According to the Table 1, in the case where the temperature of the secondary battery 6 is not lower than 25° C., it is possible to charge it with the current not exceeding the maximum current of 20 A. In the case where the temperature of the secondary battery 6 is lower than 25° C. and not lower than 10° C., the charging current is restricted to the range up to 8 A, and further in the case where the temperature of the secondary battery 6 is lower than 10° C. and not lower than 0° C., the charging current is restricted to the range up to 4 A. It is noted that the outdoor air temperature detected by a temperature sensor mounted on the vehicle may be used instead of the temperature of the secondary battery 6.

Accordingly, even when the internal resistance in the secondary battery 6 increases due to a low temperature, it is possible to charge the secondary battery 6 appropriately within the range up to its maximum charging current. Even in the case of charging in a cold climate area or using the nighttime power, the secondary battery 6 can be charged from the outside in an appropriate method by decreasing the load applied to the secondary battery 6 by the charging.

Next, the electronic control unit 30 compares the maximum charging current derived in STEP 15 with the charging current which will flow in the secondary battery 6 in the case of simply boosting the voltage by the step-up ratios derived in STEP 13, to determine whether the charging current is not greater than the maximum charging current (STEP 16).

If the charging current is equal to or smaller than the maximum charging current (YES in STEP 16), the electronic control unit 30 calculates the full charging time in the case where the secondary battery 6 is charged with that charging current (STEP 18). On the other hand, if the charging current is greater than the maximum charging current (NO in STEP 16), the electronic control unit 30 starts a current limiting circuit to set the charging current to the maximum charging current (STEP 17), and calculates the full charging time in the case where the secondary battery 6 is charged with the charging current set (STEP 18).

For calculation of the full charging time, the SOC of the secondary battery 6 and the charging power, which is obtained from the charging current and the (boosted) charging voltage for the secondary battery 6, are used to calculate the time required for the battery to be fully charged, taking into consideration the charging characteristics according to the type of the secondary battery 6. The full charging time thus calculated is displayed on the display unit 32.

Next, the electronic control unit 30 turns ON the second contactors 12A, 12B, while keeping the first contactors 11A, 11B in the OFF state (STEP 19).

The electronic control unit 30 then performs precharge processing preceding the charging of the secondary battery 6 from the external power source (STEP 20), and starts the charging (STEP 21). Here, the precharge processing is preprocessing which is performed in a circuit to prevent too large an inrush current from flowing into the secondary battery 6 at the start of the charging.

The operation of charging the secondary battery 6 in the power supply system of the present embodiment is thus completed. As described above, according to the power supply system of the present embodiment, the voltage is boosted by the voltage boost means 3 and further by the voltage control means 7. This allows the electric power supplied at a low voltage from the external power source to be boosted to a high voltage corresponding to the output voltage of the secondary battery 6 so as to be used for charging the secondary battery. Accordingly, the output voltage of the secondary battery 6 can be increased to about 500 V, as described above, and the current flowing through the secondary battery 6 at the time of charging can be made small. This realizes charging with a high voltage and a small current, and it is possible to efficiently charge the secondary battery 6 particularly in the case where the internal resistance in the secondary battery is large or in the case where quick charge is performed.

Figure 3:
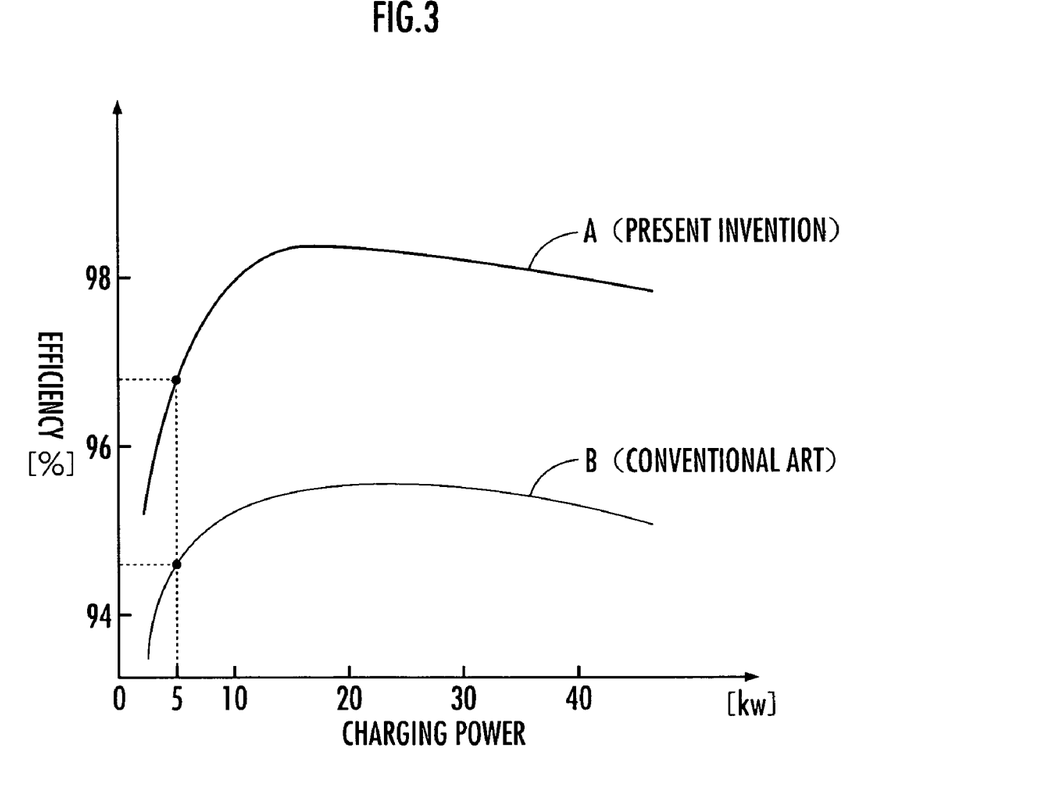
FIG. 3 illustrates the relation between the charging power and the charging efficiency.

Specifically, it is possible to improve the charging efficiency, as shown in FIG. 3. FIG. 3 illustrates the relation between the charging power [kw] and the charging efficiency [%], wherein the charging power corresponds to the supply power when charging the secondary battery 6 having an output voltage of 400 V by boosting the voltage of an external power source of 100 V. In FIG. 3, the line A indicates the relation in the case of the power supply system of the present embodiment, while the line B indicates the relation in the case of a conventional power supply system having a single voltage boosting means. For example, with the charging power of 5 kw, the charging efficiency in the case of using the power supply system of the present embodiment is about 96.8%, whereas the charging efficiency in the case of the conventional power supply system is about 94.6%. As such, the power supply system of the present embodiment is capable of performing charging more efficiently than the conventional power supply system, by reducing the loss caused when boosting the voltage up to the same charging power.

Figure 4:
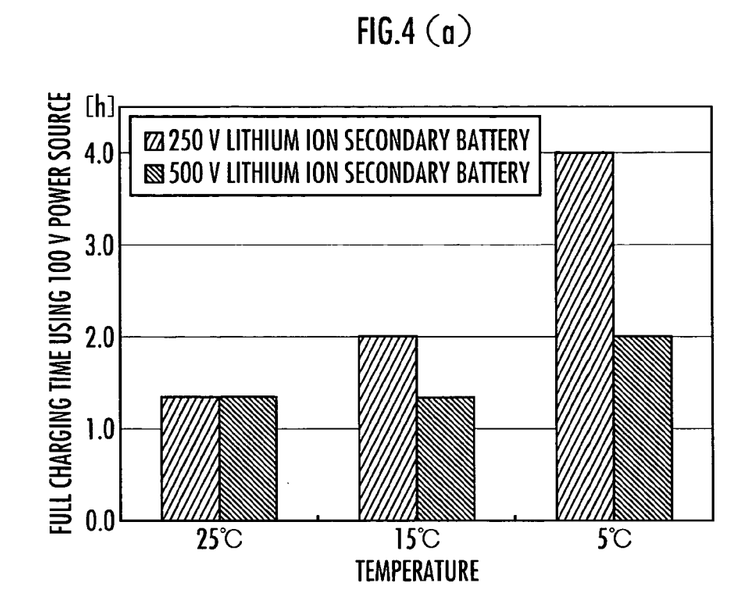
FIG. 4 illustrates the relation between the temperature and the charging time of the secondary battery.

Further, it is possible to reduce the charging time, as shown in FIG. 4. FIG. 4(a) illustrates, for different temperature conditions, the charging time required for charging the secondary battery 6 using an external power source with a voltage of 100 V and a current value of 30 A (with supply power of 3 kw), in the cases where the secondary battery 6 is configured to have an output voltage of 500 V and an output voltage of 250 V, respectively. In the case of the secondary battery 6 configured to have the output voltage of 500 V, model values of the charging voltage and the charging current are 500 V and 6 A, respectively, whereas in the case of the secondary battery 6 configured to have the output voltage of 250 V, model values of the charging voltage and the charging current are 250 V and 12 A, respectively. Here, the charging current is restricted according to the temperature of the secondary battery 6, as shown in Table 1 above.

Thus, with the secondary battery 6 at the temperature of 25° C., the charging current is within the range up to the maximum current of 20 A both in the cases where the secondary battery 6 is configured to have the output voltages of 500 V and 250 V, respectively, and accordingly, the charging time is similar in both cases. With the secondary battery 6 at the temperature of 15° C., however, in the case of the secondary battery 6 configured to have the output voltage of 250 V, the charging current is restricted to 8 A as against its model value of 12 A. Further, with the secondary battery 6 at the temperature of 5° C., in the case of the secondary battery 6 configured to have the output voltage of 500 V, the charging current is restricted to 4 A as against its model value of 6 A, and in the case of the secondary battery 6 configured to have the output voltage of 250 V, the charging current is greatly restricted to 4 A as against its model value of 12 A. Accordingly, the charging time of the secondary battery 6 can be reduced more significantly in the case of the secondary battery 6 configured to have the output voltage of 500 V, along with the decrease in temperature, as illustrated in FIG. 4(a).

FIG. 4(b) illustrates, for different temperature conditions, the charging time required for charging the secondary battery 6 using an external power source with a voltage of 200 V and a current value of 30 A (with supply power of 6 kw), in the cases where the secondary battery 6 is configured to have the output voltages of 500 V and 250 V, respectively. In the case of the secondary battery 6 configured to have the output voltage of 500 V, model values of the charging voltage and the charging current are 500 V and 12 A, respectively, while in the case of the secondary battery 6 configured to have the output voltage of 250 V, model values of the charging voltage and the charging current are 250 V and 24 A, respectively. Here, again, the charging current is restricted according to the temperature of the secondary battery 6, as shown in Table 1 above.

Thus, with the secondary battery 6 at the temperature of 25° C., the charging current is restricted to 20 A as against its model value of 24 A in the case of the secondary battery 6 configured to have the output voltage of 250 V. Further, with the secondary battery 6 at the temperature of 15° C., the charging current is restricted to 8 A as against its model value of 12 A in the case of the secondary battery 6 configured to have the output voltage of 500 V, and the charging current is greatly restricted to 8 A as against its model value of 24 A in the case of the secondary battery 6 configured to have the output voltage of 250 V. With the secondary battery 6 at the temperature of 5° C., the charging current is restricted to 4 A as against its model value of 12 A in the case of the secondary battery 6 configured to have the output voltage of 500 V, and the charging current is still more largely restricted to 4 A as against its model value of 24 A in the case of the secondary battery 6 configured to have the output voltage of 250 V. Accordingly, the charging time can be reduced more significantly in the case of the secondary battery 6 configured to have the output voltage of 500 V, along with the decrease in temperature, as illustrated in FIG. 4(*b*).

As described above, according to the power supply system of the present embodiment, even in the case of charging the secondary battery 6 in a cold climate area or using the nighttime power, it is possible to charge the secondary battery 6 from the outside in a simple and appropriate method in consideration of the configuration of the power supply system.

While description has been made about the power supply system of the present embodiment which includes the capacitor 2, not restricted thereto, the present invention is also applicable to the power supply system which does not include the capacitor 2.

Further, in the power supply system of the present embodiment, it has been configured such that charging is performed basically with a charging current that is determined according to the step-up ratios of the voltage boost means 3 and the voltage control means 7, and the charging current is changed to a maximum charging current where appropriate. However, not restricted thereto, it may also be configured such that a user of the fuel cell vehicle sets a full charging time, and the charging is performed with a charging current that allows the secondary battery 6 to be fully charged in the full charging time set by the user.

Second Embodiment

Figure 5:
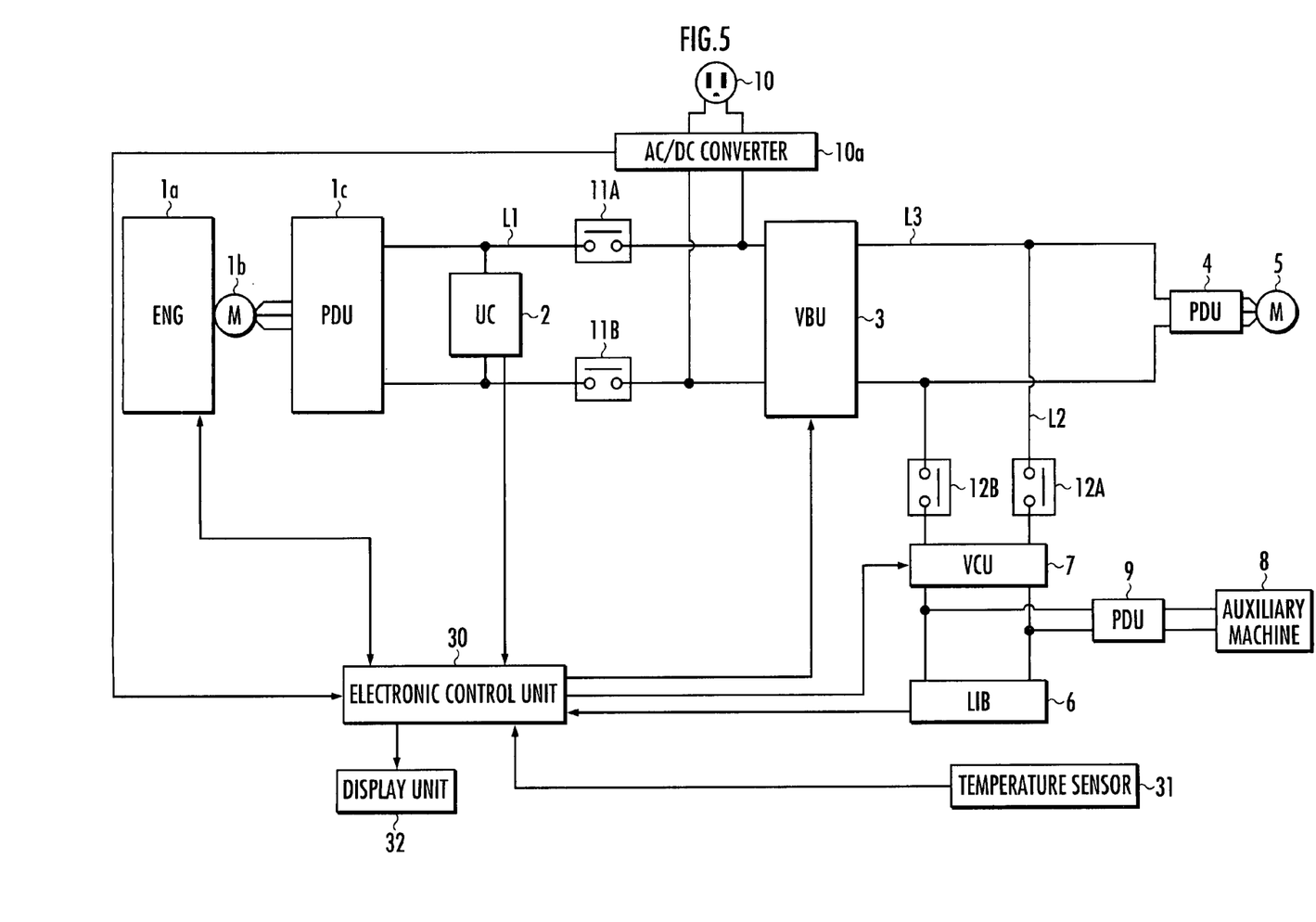
FIG. 5 illustrates a configuration of the power supply system according to a second embodiment of the present invention.

A power supply system according to a second embodiment of the present invention will now be described with reference to FIG. 5. The power supply system of the present embodiment differs from that of the first embodiment described above only in the configuration of the electric power supply means. Thus, similar components are denoted by similar reference characters, and description thereof will not be repeated.

In the power supply system according to the present embodiment, as the electric power supply means, an engine 1*a* and a motor 1*b* connected to an output shaft of the engine 1*a* and serving as an electric power generator are provided in place of the fuel cell 1 in the first embodiment. The motor 1*b* is provided with a power drive unit (PDU) 1*c*, and electric power output from the motor 1*b* is converted to a DC power via the PDU 1*c*.

According to the power supply system of the present embodiment, the electronic control unit 30 controls the amount of the fuel supplied to the engine 1*a*, and hence, the electric power generated by the motor 1*b*.

With the power supply system of the present embodiment, as in the case of the power supply system of the first embodiment described above, it is possible to charge the secondary battery 6 from the outside in a simple and appropriate method in consideration of the configuration of the power supply system.

While description has been made in the present embodiment about the case where the present invention is adapted to a series-type hybrid vehicle in which the engine 1*a* is used solely for generating electric power, not restricted thereto, the present invention is also applicable to a parallel-type hybrid vehicle in which an engine is provided in one of the electric motor 5 and the motor 1*b* to generate electric power by the engine, and driving force of the engine is also transmitted to the wheels via a transmission.

Third Embodiment

Figure 6:
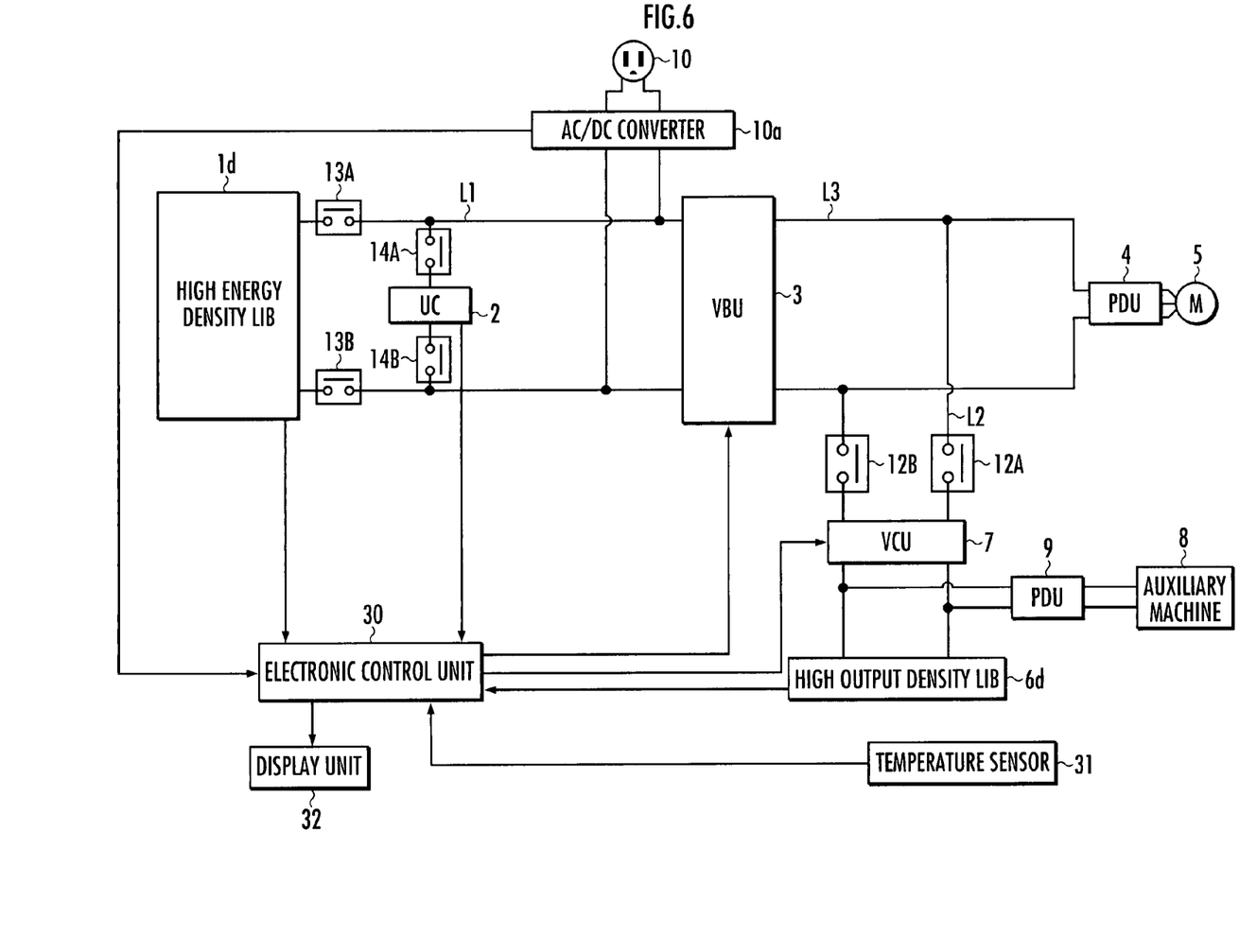
FIG. 6 illustrates a configuration of the power supply system according to a third embodiment of the present invention.

Now, a power supply system according to a third embodiment of the present invention will be described with reference to FIG. 6. The power supply system of the present embodiment differs from that of the first embodiment described above only in the configuration of the electric power supply means and the electric power accumulating means. Thus, similar components are denoted by similar reference characters, and description thereof will not be repeated.

In the power supply system of the present embodiment, a high energy density secondary battery 1*d* is provided as the electric power supply means, in place of the fuel cell 1 in the first embodiment, and a high output density secondary battery 6*d* is provided as the electric power accumulating means.

The high energy density secondary battery 1*d* is a secondary battery with higher energy density and lower output density than a high output density secondary battery. It is made up of cells connected in series, each cell including, e.g., a lithium-metal-phosphate compound ($LiFePO_4$, $LiMnPO_4$, and the like) as a positive electrode material and a graphite carbon material as a negative electrode material. The high output density secondary battery 6*d* is a secondary battery with higher output density and lower energy density than a high energy density secondary battery. It is made up of cells connected in series, each cell including, e.g., a lithium metal oxide ($LiMn_2O_4$, $LiNiO_2$, $LiCoO_2$, and the like) as a positive electrode material and an amorphous carbon material (hard carbon) as a negative electrode material.

The power supply system of the present embodiment further includes third contactors 13A, 13B (corresponding to the "first suppressing means" of the present invention) provided between the high energy density secondary battery 1*d* and the first electric power supply line L1 to turn ON/OFF the connection therebetween, and fourth contactors 14A, 14B (corresponding to the "second suppressing means" of the present invention) provided between the capacitor 2 and the first electric power supply line L1 to turn ON/OFF the connection therebetween.

According to the power supply system of the present embodiment, as in the case of the power supply system of the first embodiment described above, it is possible to charge the high output density secondary battery 6*d* from the outside in a simple and appropriate method in consideration of the configuration of the power supply system. Furthermore, it is possible to directly charge the high energy density secondary battery 1*d* and the capacitor 2 from the first electric power supply line L1 via the third contactors 13A, 13B and the fourth contactors 14A, 14B.

While description has been made in the present embodiment about the power supply system including the capacitor 2, not restricted thereto, the present invention is also applicable to the power supply system which does not include the capacitor 2.

We claim:

1. A power supply system mounted on a vehicle, the system comprising:
    an electric power supply means;
    a first voltage boosting means having one end connected to the electric power supply means and another end connected to an electric motor for driving the vehicle, the first voltage boosting means boosting an output voltage from the electric power supply means for supplying the electric motor with electric power resulting from the boosted voltage;
    a second voltage boosting means having one end connected to the other end of the first voltage boosting means and in parallel with the electric motor, the second voltage boosting means further boosting an output voltage from the first voltage boosting means;

an electric power accumulating means connected to another end of the second voltage boosting means; and an external power source connecting means connected to the one end of the first voltage boosting means and in parallel with the electric power supply means, the external power source connecting means receiving supply of electric power from an external power source.

2. The power supply system according to claim 1, further comprising:

a first suppressing means for suppressing supply of electric power from the external power source to the electric power supply means; and a charging control means for charging the electric power accumulating means from the external power source by controlling step-up ratios of the first voltage boosting means and the second voltage boosting means such that a voltage applied to the electric power accumulating means during the charging becomes a desired voltage.

3. The power supply system according to claim 2, further comprising a temperature detecting means for detecting a temperature of the electric power accumulating means, wherein the charging control means derives a maximum current that can flow into the electric power accumulating means in accordance with the temperature detected by the temperature detecting means, to charge the electric power accumulating means with the maximum current.

4. The power supply system according to claim 1, wherein the external power source connecting means includes a power supply voltage detecting means for detecting an output voltage from the external power source, and the charging control means controls the step-up ratios of the first voltage boosting means and the second voltage boosting means in accordance with the output voltage detected by the power supply voltage detecting means.

5. The power supply system according to claim 1, wherein the electric power supply means includes a fuel cell.

6. The power supply system according to claim 5, further comprising:

a capacitor connected to the one end of the first voltage boosting means and in parallel with the fuel cell; and a second suppressing means for suppressing supply of electric power from the external power source to the capacitor.

7. The power supply system according to claim 1, wherein the electric power supply means includes an engine and a generator, the generator being connected to an output shaft of the engine and serving as an electric power generator.

8. The power supply system according to claim 1, wherein the electric power supply means includes a high energy density secondary battery, and the electric power accumulating means includes a high output density secondary battery.

* * * * *